United States Patent
Diaz-Loya et al.

(10) Patent No.: US 9,394,200 B2
(45) Date of Patent: Jul. 19, 2016

(54) HIGHLY WORKABLE, HIGH STRENGTH CEMENT COMPOSITIONS

(71) Applicant: Ceratech Inc., Alexandria, VA (US)

(72) Inventors: Ivan Diaz-Loya, Baltimore, MD (US); Rajeshkumar Patel, Catonsville, MD (US); David Hoffman, Littlestown, PA (US); Joseph Trzpekowski, Bel Air, MD (US); Frederick Kinney, Bel Air, MD (US)

(73) Assignee: Ceratech Inc, Alexandria, VA (US)

( * ) Notice: Subject to any disclaimer, the term of this patent is extended or adjusted under 35 U.S.C. 154(b) by 133 days.

(21) Appl. No.: 14/070,192

(22) Filed: Nov. 1, 2013

(65) Prior Publication Data

US 2015/0122154 A1  May 7, 2015

(51) Int. Cl.

| | |
|---|---|
| C04B 7/26 | (2006.01) |
| C04B 24/00 | (2006.01) |
| C04B 24/04 | (2006.01) |
| C04B 24/06 | (2006.01) |
| C04B 24/34 | (2006.01) |
| C04B 24/38 | (2006.01) |
| C04B 28/02 | (2006.01) |
| C04B 7/24 | (2006.01) |

(52) U.S. Cl.
CPC . *C04B 7/26* (2013.01); *C04B 7/243* (2013.01); *C04B 24/006* (2013.01); *C04B 24/04* (2013.01); *C04B 24/06* (2013.01); *C04B 24/34* (2013.01); *C04B 24/38* (2013.01); *C04B 28/021* (2013.01); *Y02P 40/145* (2015.11)

(58) Field of Classification Search
CPC ....................................................... C04B 7/26
See application file for complete search history.

(56) References Cited

U.S. PATENT DOCUMENTS

| | | | |
|---|---|---|---|
| 3,144,347 | A | 8/1964 | Cowan |
| 3,856,541 | A | 12/1974 | Martin |
| 4,230,765 | A | 10/1980 | Takahashi et al. |
| 4,313,763 | A | 2/1982 | Turpin |
| 4,798,628 | A | 1/1989 | Mills et al. |
| 4,997,484 | A | 3/1991 | Gravitt et al. |
| 5,553,670 | A | 9/1996 | Cowan |
| 5,556,458 | A | 9/1996 | Brook et al. |
| 5,605,571 | A | 2/1997 | Buerge et al. |
| 6,641,658 | B1 | 11/2003 | Dubey |
| 6,740,155 | B1 | 5/2004 | Boggs et al. |
| 7,288,148 | B2 | 10/2007 | Hicks et al. |
| 7,442,248 | B2 | 10/2008 | Timmons |
| 8,016,937 | B2 | 9/2011 | Schumacher et al. |
| 8,186,106 | B2 | 5/2012 | Schumacher et al. |
| 8,349,072 | B2 | 1/2013 | Schumacher et al. |
| 8,747,548 | B2 | 6/2014 | Schumacher et al. |
| 2003/0089281 | A1 | 5/2003 | Berke et al. |
| 2005/0160946 | A1 | 7/2005 | Comrie |
| 2005/0241537 | A1 | 11/2005 | Hicks et al. |
| 2005/0252420 | A1 | 11/2005 | Timmons |
| 2006/0025312 | A1 | 2/2006 | Santra et al. |
| 2012/0285682 | A1 | 11/2012 | Santra et al. |
| 2013/0160678 | A1 | 6/2013 | Schumacher et al. |
| 2013/0284069 | A1 | 10/2013 | Dubey |

FOREIGN PATENT DOCUMENTS

| | | |
|---|---|---|
| CN | 85 1 08582 | 7/1986 |
| CN | 1890192 | 1/2007 |
| EP | 1 344 754 | 9/2003 |
| EP | 1 380 554 | 1/2004 |
| JP | 1-270553 | 10/1989 |
| JP | 2-502629 | 8/1990 |
| JP | 2-311340 | 12/1990 |
| JP | 6-157099 | 6/1994 |
| JP | 8-301642 | 11/1996 |
| JP | 9-20538 | 1/1997 |
| JP | 2000-281412 | 10/2000 |
| JP | 2003-306368 | 10/2003 |
| JP | 2004-43238 | 2/2004 |
| JP | 2004-123465 | 4/2004 |
| JP | 2010-516604 | 5/2010 |
| WO | WO-89/05284 | 6/1989 |
| WO | WO-2008/089481 | 7/2008 |

OTHER PUBLICATIONS

Office Action dated Oct. 28, 2014, directed to CA Application No. 2,787,105; 5 pages.
Extended European Search Report dated Feb. 20, 2014, directed to EP Application No. 11732312.1; 5 pages.
Office Action dated Jan. 20, 2014, directed to CA Application No. 2,675,750; 3 pages.
Notice of Office Action mailed Jan. 29, 2014, directed to KR Application No. 10-2009-7017248; 14 pages.
Notification of Decision to Grant or Register dated Jan. 24, 2014, directed to ARIPO No. AP/P/2009/004934; 4 pages.
Shumacher et al., U.S. Office Action dated Aug. 31, 2015, directed to U.S. Appl. No. 14/299,138; 10 pages.
The Second Office Action dated Jul. 18, 2014, directed to CN Application No. 201180013447.7; 10 pages.
Notice of Reasons for Rejection mailed Apr. 10, 2014, directed to JP Application No. 2012-549001; 6 pages.
International Search Report and Written Opinion mailed Mar. 10, 2015, directed to International Application No. PCT/US14/63539; 10 pages.

(Continued)

*Primary Examiner* — Paul Marcantoni
(74) *Attorney, Agent, or Firm* — Morrison & Foerster LLP

(57) ABSTRACT

Pozzolanic cement compositions and method manufacturing the same are described. These cement compositions may include a pozzolanic material and an activator based on a salt of glycolic acid, glyceric acid, malic acid, tartaric acid, malonic acid, glutaric acid, maleic acid, formic acid, acetic acid, propionic acid, or butyric acid, a retarder based on heptogluconates, sulfate salts, sugars, sugar acids, lignins, and/or an accelerator based on amines. The cement compositions may have less than 10% by weight Portland cement. The pozzolanic cement compositions including these activators, accelerators, and retarders can have improved properties such as longer setting time, better slump retention, and improved strength.

36 Claims, No Drawings

(56) References Cited

OTHER PUBLICATIONS

Reexamination Decision dated Dec. 24, 2014, directed to CN Application No. 200880009159.2; 18 pages (with partial English Translation).

Notice of Grant of a Patent Right for an Invention dated Jan. 28, 2015, directed to CN Application No. 201180013447.7; 3 pages.

Notice of Reasons for Rejection mailed Jan. 7, 2015, directed to JP Application No. 2012-549001; 8 pages.

Shumacher et al., U.S. Office Action dated Mar. 17, 2015, directed to U.S. Appl. No. 14/299,138; 13 pages.

International Search Report and Written Opinion mailed May 7, 2008, directed to International Application No. PCT/US2008/51664; 12 pages.

International Search Report and Written Opinion mailed Mar. 11, 2011, directed to International Application No. PCT/US11/20822; 11 pages.

Schumacher et al., Quayle Action mailed Apr. 5, 2011 directed to U.S. Appl. No. 12/017,956; 3 pages.

Patent Examination Report No. 1 dated Jul. 26, 2012, directed to AU Application No. 2008206067; 4 pages.

Notice of Acceptance dated Aug. 21, 2013, directed to AU Application No. 2008206067; 3 pages.

The First Office Action dated Aug. 3, 2012, directed to CN Application No. 200880009159.2; 28 pages.

Rejection Decision dated Apr. 26, 2013, directed to CN Application No. 200880009159.2; 31 pages.

Extended European Search Report dated May 21, 2012, directed to EP Patent Application No. 08713903.6; 7 pages.

Notice of Reasons for Rejection mailed Jan. 24, 2013, directed to JP Application No. 2009-546574;12 pages.

Notice of Reasons for Rejection mailed Aug. 7, 2013, directed to JP Application No. 2009-546574;8 pages.

Official Action mailed Dec. 22, 2011, directed to RU Application No. 2009131446/03(043981); 11 pages.

Schumacher et al., U.S. Office Action mailed Feb. 22, 2012, directed to U.S. Appl. No. 13/004,303; 17 pages.

Examination and Search Report dated Mar. 1, 2013, directed to ARIPO No. AP/P/2009/004934; 5 pages.

Schumacher et al., U.S. Office Action dated Apr. 8, 2013, directed to U.S. Appl. No. 13/734,732; 18 pages.

Shumacher et al., U.S. Office Action dated Jul. 23, 2013, directed to U.S. Appl. No. 13/734,732; 9 pages.

International Preliminary Report on Patentability and Written Opinion mailed Jul. 26, 2012, directed to International Application No. PCT/US2011/020822; 10 pages.

Patent Examination Report No. 1 dated Oct. 2, 2013, directed to AU Application No. 2011203901; 4 pages.

The First Office Action dated Nov. 20, 2013, directed to CN Application No. 201180013447.7; 6 pages.

ASTM Committee C09. (Jan. 2013). "Standard Specification for Coal Fly Ash and Raw or Calcined Natural Pozzolan for Use in Concrete," *ASTM International*. C618-12a: 5 pages.

HIGHLY WORKABLE, HIGH STRENGTH CEMENT COMPOSITIONS

FIELD OF THE INVENTION

A novel family of compositions is disclosed for the production of blended hydraulic cementitious materials and their concrete and mortar derivatives for original construction, repair, manufactured concrete products, armor, spray and other applications. These materials exhibit controlled reactions of calcium-containing industrial byproducts with chemical activators, accelerators, retarders, bond enhancers, and mechanical strength modifiers.

BACKGROUND OF THE INVENTION

Materials with pozzolanic properties contain vitreous silica and alumina that will, in the presence of water and free lime, react with the calcium to produce calcium silicate and calcium-alumina-silicate hydrates. There are both natural and industrial pozzolans.

Industrial pozzolans are produced during industrial processes and include, for example, Class C and Class F fly ashes as defined in accordance with American Society of Tests and Materials (ASTM) specification C618. These fly ashes are produced during the combustion of coal. They consist of the inorganic, incombustible matter present in the coal that has been fused during combustion into an amorphous structure. The classification of industrial produced fly ash depends on the type of coal used and its chemical composition. The combustion of lignite or subbituminous coal typically produces Class C fly ash. The combustion of anthracite and bituminous coal typically produces Class F fly ash.

As defined by ASTM C618, the characteristics of Class C fly ash include higher lime content than Class F fly ash. The higher lime content in Class C fly ash allows Class C fly ash to be self-hardening, while Class F fly ash typically requires the addition of lime or cement to form hydrated cementitious materials.

An example of a natural pozzolan is Class N pozzolanic ash. Class N pozzolanic ash is a raw or calcined natural pozzolan such as some diatomaceous earths, opaline cherts, and shales; tuffs, volcanic ashes, and pumicites; and calcined clays and shales.

The chemical and physical attributes of Class C, Class F and Class N pozzolanic ashes are defined by ASTM-C618, the contents of which are hereby incorporated by reference in their entirety.

It is known to use fly ash in cement compositions, typically in the presence of Portland cement. U.S. Pat. No. 5,556,458 to Brook, et al., for example, requires at least 20% Portland cement. In particular, Brook, et al. notes that Portland cement is required in their composition to overcome the low early strength of fly ash compositions.

U.S. Pat. No. 4,997,484 to Gravitt et al. and U.S. Pat. No. 7,288,148 to Hicks et al. disclose fly ash cement compositions without Portland cement, but rely on an acid-base reaction system that utilize the combined effects of citric acid (≈pH 2.2) and either an alkali hydroxide (≈pH 12-14) or metal carbonate (≈pH 11.6). However, the fly ash cement compositions of Gravitt and Hicks do not exhibit the working time, strength, durability, and hardness required by many cement applications.

BRIEF SUMMARY OF THE INVENTION

Described are cement compositions in which the cementitious properties of natural and/or industrial pozzolanic materials are carefully controlled. The pozzolanic cement compositions may be substantially free of strong acids and bases such as citric acids (≈pH 2.2) and alkali metal activators including alkali hydroxides (≈pH 12-14) and metal carbonates (≈pH 11.6). Instead of relying on the traditional acid-base chemistry to activate or accelerate cement hydration, the present invention relies on activators based on certain hydroxycarboxylic acid salts, dicarboxylic acid salts, and carboxylic acid salts, and/or on retarders based on hepto-gluconates, sugars, sugar acids, sulfates, and lignins. Some embodiments of the present invention may also rely on accelerators based generally on amines. The present invention is based on the discovery that these activators and retarders unexpectedly and surprisingly improve the cements' properties such as longer setting time and better slump retention while maintaining or improving mechanical strength. Also, in certain cases where instant set time is desired, amine-based accelerators may be used as well.

Activators may be based on the salts of the hydroxycarboxylic acids glycolic, glyceric, malic, and tartaric acid, the dicarboxylic acids malonic, glutaric, and maleic acid, and the carboxylic acids formic, acetic, propionic, and butyric acid. Accelerators, if desired, may be based on amines, and retarders may be based on hepto-gluconates, sugars, sugar acids, sulphates, and lignins.

One embodiment is a pozzolanic cement composition including a pozzolanic material and an activator based on a salt of glycolic acid, glyceric acid, malic acid, tartaric acid, malonic acid, glutaric acid, maleic acid, formic acid, acetic acid, propionic acid, butyric acid, or combinations thereof. In a preferred embodiment, the activator is present in an amount of 0.1 to 30% of the total weight of the pozzolanic cement composition. More preferably, the total amount of the salt of glycolic acid, glyceric acid, malic acid, tartaric acid, malonic acid, glutaric acid, maleic acid, formic acid, acetic acid, propionic acid, and butyric acid makes up more than 95% by weight of the total weights of activators in the pozzolanic cement composition. In addition, the pozzolanic cement composition may include a retarder based on sulfate salts, sugars, sugar acids, lignins, boron compounds or combinations thereof. The cement composition may include the retarder, for example, in an amount of 0.1 to 3.0 weight percent, based on the total weight of the pozzolanic cement composition.

Another embodiment is a pozzolanic cement composition including a pozzolanic material and an accelerator based on an amine. In a preferred embodiment, the amine is present in an amount of 0.1 to 30% of the total weight of the pozzolanic cement composition. The amine, for example, may be triethanolamine or triisopropanolamine. In addition, the pozzolanic cement composition may include a retarder based on sulfate salts, sugars, sugar acids, lignins, boron compounds or combinations thereof. The cement composition may include the retarder, for example, in an amount of 0.1 to 3.0 weight percent, based on the total weight of the pozzolanic cement composition.

Another embodiment is a pozzolanic cement composition including a pozzolanic material, an activator or accelerator, and a retarder based on hepto-gluconate. The pozzolanic cement composition may include both an activator and an accelerator. In some embodiments, the retarder can also include a boron compound. For example, the boron compound can be selected from the group consisting of boric acid, boric oxide, sodium borate, sodium tetraborate, potassium borate and potassium tetraborate, borax pentahydrate, and borax decahydrate. In a preferred embodiment, the hepto-gluconate is present in an amount of 0.1 to 3.0 weight percent, based on the total weight of the pozzolanic cement composition.

In some embodiments, the pozzolanic cement composition has a set time of between 2 hours and 24 hours. In some embodiments, the pozzolan material is selected from the group consisting of Class C fly-ash, Class F fly-ash, Class N pozzolanic ash, and combinations thereof. In some embodiments, the pozzolanic cement composition has a silica to calcia molar ratio of between about 1.2:1 and 1.4:1. In some embodiments, the pozzolanic cement composition is substantially free of citric acid activators, lactic acid activators, alkali metal activators, and metal carbonate activators.

Another embodiment is a method of forming a hardened pozzolanic cement composition including mixing a hydratable composition comprising pozzolanic material, one or more activators or accelerators, and a retarder based on hepto-gluconate. The retarder may further include a boron compound, such as, for example, boric acid, boric oxide, sodium borate, sodium tetraborate, potassium borate and potassium tetraborate, borax pentahydrate, and borax decahydrate. The method may further include the step of dissolving the hepto-gluconate in a solution of the activators and accelerators in a concentration between 0.1% and 30.0% prior to mixing with the pozzolanic material. Preferably, the concentration is between 10.0% and 30.0%.

The pozzolanic cement composition of the invention may include any source of pozzolanic material whether naturally occurring or man made, including rice hull ash, volcanic ash pumicites, opal and other shalls, diatomaceous earths, opaline cherts, tuffs, calcined clays, Class C fly ash, Class F fly ash, Class N pozzolanic ash, either alone or in combination. The cement composition may also include other additives, including silica fume, calcium aluminate, magnesium oxide, lime, gypsum, one or more retarding additives from the boron compound family (for example, borate salts, boric acid, boric oxide, or borax), organic retarders, reactive clays such as meta-kaolin, wollastonite, air entraining agents (AEA), viscosity modifying agents (VMA), plasticizers, latex, fibers (for fracture toughness), or shrinkage compensation additives (SRA). Where the primary pozzolanic material is Class F fly ash or Class N pozzolanic ash, the cement includes one or more calcium-rich materials, preferably industrial byproducts such as cement kiln dust, lime kiln dust, furnace slag and scrubber ash.

In some embodiments, the pozzolanic material may consist essentially of 100% Class C fly ash. In other embodiments, the pozzolanic cement composition may alternatively include, for example, 50 to 95 weight percent Class C fly ash based on the total weight of the pozzolanic cement composition; consist essentially of Class F fly ash and the cement may further include a calcium-rich material additive; include 0.5 to 50 weight percent Class F fly ash based on the total weight of the pozzolanic cement composition; or consist essentially of Class N pozzolanic ash and the cement may further comprises a calcium-rich material additive. According to another embodiment, the pozzolanic material consists essentially of Class C fly ash and Class F fly ash, wherein the Class C fly ash is present in an amount of 50-100 weight percent, and the Class F fly ash is present in an amount of 0-30 weight percent based on the total weight of the pozzolanic cement composition.

The disclosed pozzolanic cement compositions may be used alone or blended with other cements such as Portland cement, slag cements, and other types of conventional hydraulic cements. However, the pozzolanic cement compositions of the present invention do not require the presence of other cements in order to exhibit their superior properties. Accordingly, pozzolanic cement compositions according to the invention may be substantially free of Portland cement. The phrase "substantially free" means present in an amount of less than one weight percent based on the total weight of the referenced composition. Substantially free includes the meaning completely free. The pozzolanic cement compositions may also include one or more fillers in addition to the cement. According to another embodiment, the pozzolanic cement compositions may have Portland cement in amounts less than 20% by weight, and more preferably less than 15%, less than 10%, and less than 2% by weight, based on the total weight of the pozzolanic cement compositions. In some embodiments, the pozzolanic cement compositions may include sulfates or organic compounds.

In some embodiments, the pozzolanic cement compositions possess unexpectedly high dimensional stability, strength, hardness, working times, permeability, sulfate resistance, freeze-thaw resistance, mitigation of alkali-aggregate reactivity, and/or easily controlled, wide range of setting times. According to another embodiment, a mortar, grout, or concrete includes a hydraulic cement in which the cement is activated by an activator based on a salt of glycolic acid, glyceric acid, malic acid, tartaric acid, malonic acid, glutaric acid, maleic acid, formic acid, acetic acid, propionic acid, butyric acid, or combinations thereof. In another embodiment, the mortar, grout, or concrete includes a hydraulic cement in which the cement is accelerated by an amine, for example, triethanolamine or triisopropanolamine. In another embodiment, the mortar, grout, or concrete includes a hydraulic cement in which the cement is retarded by a retarder based on hepto-gluconate.

In certain embodiments, the pozzolanic cement composition has a calcium content expressed as the oxides of 20 wt % or more based on the total weight of the pozzolanic cement composition. Some embodiments may include a calcium-rich material additive. The calcium-rich material may include, for example, an industrial byproduct selected from the group consisting of cement kiln dust, lime kiln dust, furnace slag, scrubber ash, and combinations thereof. In other embodiments, Class C fly-ash may comprise 50 to 95 weight percent of the total weight of the pozzolanic cement compositions. In other embodiments, the pozzolanic material consists essentially of Class F fly-ash and a calcium-rich material additive. In still other embodiments, the pozzolanic cement composition includes 0.5 to 50 weight percent Class F fly-ash based on the total weight of the pozzolanic cement composition. Other embodiments may include a pozzolanic material consisting essentially of Class N pozzolanic ash and a calcium-rich material additive. The pozzolanic cement composition of certain embodiments may comprise 0.5 to 50 weight percent Class N pozzolanic ash based on the total weight of the pozzolanic cement composition. In certain embodiments, the retarder comprises sulfates or organic compounds.

DETAILED DESCRIPTION OF THE INVENTION

High temperature sintering (in the case of Portland cement) or a strong acid-base chemistry (in the case of prior art pozzolanic cements) has generally been used to provide the strength and hardness required by most cement applications. It has been discovered that by using pH neutral activators cement products can be produced that have superior properties compared to Portland cement or to pozzolanic cements prepared according to traditional acid-base activator chemistries. U.S. Pat. No. 8,016,937, the entirety of which is incorporated herein by reference, describes improved cementitious compositions comprising pozzolan powders and a pH neutral citric salt. U.S. Pat. No. 8,349,072, the entirety of which is incorporated herein by reference, describes improved pozzolanic cements comprising a chemical activator based on the salts of lactic acid.

Described herein are pozzolanic cement compositions based on certain activators, accelerators, and retarders that when combined with pozzolanic materials can produce cements with improved properties such as longer setting time and better slump retention while maintaining or improving mechanical strength. The improved setting time and slump retention of the cement formulations allow workers more time to conduct surface finishing operations to obtain desired textures as compared to Portland cement or pozzolanic cements prepared with traditional acid-base activators, and the improved properties may be achieved without sacrificing the cement's mechanical strength.

Activators based on salts of the hydroxycarboxylic acids glycolic, glyceric, malic, and tartaric acid, salts of the dicarboxylic acids malonic, glutaric, and maleic acid, and salts of the carboxylic acids formic, acetic, propionic, and butyric acid are described. Surprisingly, the salts of tartaric and malic acid may have a retarding effect at lower concentrations while acting as activators at higher concentrations.

Also disclosed are accelerators that can improve pozzolanic cement properties. These accelerators may or may not include amines. Such amines include triethanolamine and triisopropanolamine. Other amines are diethanolamine, diethylamine, and polyethanolamine. These amine-based accelerators are used to decrease setting time by accelerating the rate of hydration and to accelerate strength development in concrete at an early age. Also, the extent of effectiveness of these amine-based accelerators in the context of activation and retardation may depend on specific combinations with other ingredients. Certain accelerators, such as those based on sodium silicates, are known to decrease the long-term strength of cement. One or more accelerators described herein can provide the advantage of reducing set time and/or increasing early strength development while not reducing long-term cement strength. Amine-based accelerators are preferred when almost instant set time is desired.

Retarders based on hepto-gluconates, sulfate salts, sugars, sugar acids, and lignins are also disclosed. These retarders can produce cements with superior plastic properties. Retarders are known to delay hydration of cement particles in cementitious compositions. This prolonging of the time of hydration allows more time for working and/or transporting the cement before it sets. It is widely believed that retarders generally work by slowing down the speed of reaction between cement particles and water by affecting the growth of hydration products and/or reducing the rate of water penetration to the cement particles. Adjusting the quantity of retarder changes the set delay time; however, too much retarder may delay setting altogether. The inventors discovered that the retarders described herein can be particularly effective in increasing working time without delaying setting altogether while not adversely affecting the strength of pozzolanic cements.

Hepto-gluconates are particularly effective as retarders when used with the pozzolanic compositions described herein. Hepto-gluconates are hydroxycarboxylic acids that have a strong retarding effect even in low concentrations. The retarding action is attributed to the presence of alpha or beta hydroxycarboxylic groups which are capable of strongly chelating metal cations such as calcium. Highly stable molecules are formed that poison hydrate nucleation sites, thus preventing or slowing hydration and setting. Hepto-gluconates such as sodium, calcium, magnesium, and zinc hepto-gluconate may be used. These hepto-gluconates are generally easily soluble in water making them ideal for liquid admixtures. It has further been discovered that combining hepto-gluconate with a borate is effective in achieving a longer set time when used with high-ash pozzolans. Borates are known to be effective as strengtheners. A retarder that combines hepto-gluconate with a borate may also exhibit a strengthening effect.

Sulfate salts, sugars, sugar acids, and lignins are also effective retarders in certain pozzolanic compositions described herein. A lignin is a complex, highly polymeric, natural compound that is a main component of wood. Lignins are generally easily soluble in water making them ideal for liquid admixtures. Examples of lignins suitable as retarders are the sodium and calcium salts of lignosulfonic acids. Sugars act as retarders by preventing hydrates from forming. The sugars may be, for example, sucrose, glucose, fructose, maltose, trehalose, and raffinose. Not all sugars retard to the same extent, and they are generally categorized as highly efficient, moderate, or inefficient retarders. Sucrose and raffinose are highly efficient retarders, glucose and maltose are moderate retarders, and trehalose is an inefficient retarder. The sugar acids may be, for example, aldohexonic acid, ascorbic acid, glyceric acid, and gluconic acid. Sulphate salts such as gypsum control hydration reactions resulting in better workability for longer duration. Gypsum is also known to contribute to strength acceleration in the early stages of hydration.

The cementitious properties of pozzolanic materials in cementitious compositions can be carefully controlled using the activators, accelerators, and/or retarders described herein and need not utilize the traditional acid-base chemistry. One or more pH neutral activator, for example salts of hydroxycarboxylic acids such as glycolic, glyceric, malic, and tartaric acid, salts of dicarboxylic acids such as malonic, glutaric, and maleic acid, and salts of carboxylic acids such as formic, acetic, propionic, and butyric acid are used as reaction activators. Other examples of pH neutral activators include malic acid, malonic acid, glycolic acid, and salts of these acids, calcium nitrate and other nitrate salts. The pH neutral activator dissolves or dissociates in the presence of fly-ash and allows the hydration reaction with the fly-ash, upon the addition of water, to proceed in a uniform, well controlled manner. Accelerators may also be used instead of or in combination with the activators to achieve different mechanical and plastic properties such as slump retention, workability, and strength. Retarders, for example hepto-gluconate, sulfate salts, sugars, sugar acids, and lignins may be used in the compositions to slow or modify the hydration reaction. This controlled reaction approach allows for working times in ranges from as little as 10 minutes to 12 hours or more. Boric compounds, or other conventional retarders, may also be used. One skilled in the art would understand that the compositions may be designed to have any number of desired set times including between 30 minutes and 12 hours, greater than 2 hours, greater than 4 hour and greater than 6 hours.

Embodiments of this invention may also include combinations of pozzolanic materials, for example, both Class C and Class F fly ash. The reaction of Class C fly ash can produce considerable heat, and this heat can cause early-stage shrinkage as the product is placed. This shrinkage can result in cracking and delamination from a substrate. Class F fly ash contains little or no calcium oxide (CaO), and is slowly reactive with the lactate activator. Accordingly, the inclusion of some Class F fly ash in the reaction mixture moderates the reaction forming the solid product by uniformly distributing strong, uniformly sized glass microspheres throughout the mixture. Additionally these thermal reactions are regulated by the use of the activators, accelerators, and retarders discussed herein. The method by which this is accomplished is by controlling the early conversion rate to the hydrated compounds. Consequently, while the total heat generated is the same, the time to achieve the hydration is broadened which allows heat dissipation to the environment in a more controlled manner.

Cement materials activated and accelerated with chemical activators and accelerators of the present invention, upon reaction with water, preferably include hydrates having silica to calcia molar ratios (S:C) of from about 1:1 to about 1.8:1, typically from about 1.1:1 to about 1.5:1. As particular examples, the S:C molar ratio may be about 1.2:1, 1.3:1 or 1.4:1. The relative amounts of calcium-containing industrial by-products (e.g., Class C fly ash) and low-calcium or siliceous industrial by-products (e.g., Class F fly ash) may be selected in order to achieve the desired S:C molar ratio.

Materials

The cements according to the present invention may include the materials set forth below, in amounts expressed in terms of weight percentage of the entire pozzolanic cement composition, not including sand, stone and other fillers. The term "cement" is generally used herein to refer to the binder composition. The term "cementitious composition" is generally used herein to refer to the combination of the cement (or binder) and filler, for example sand, stone, and the like. The cementitious compositions typically includes from about 5 to about 60 percent cement.

Natural or industrial pozzolanic materials. Examples of pozzolanic materials include Class C fly ash, Class F fly ash, and Class N pozzolanic ash. The cement compositions may include Class C fly ash as a high calcium-containing pozzolanic material. In some embodiments, Class C fly ash may be included in the cement in the range of about 50 to about 98 weight percent, within the range of about 60 to about 95 weight percent, or within the range of about 70 to about 95 weight percent. Preferably, the calcium content expressed as the oxides (CaO) of the high calcium containing pozzolanic materials is higher than about 22 weight percent and is in the range of about 22 to about 30 weight percent. If the CaO content is low, additional lime bearing components such as calcium hydroxide, nitrates, nitrites, sulfates or carbonates may be added. Note that although the use of Class C fly ash as the high calcium-containing pozzolanic material is primarily described herein, other types of calcium-containing pozzolanic materials may be used in some embodiments as partial or total substitutes for the Class C fly ash (for example, blast furnace slag, cement kiln dust, and lime kiln dust).

The cement may additionally or alternatively include one or more relatively low calcium or high silicon containing pozzolanic materials. Preferably, the cement includes at least one pozzolanic material with a calcium content expressed as the oxides of 20 to 30 weight percent. In some embodiments, Class F fly ash may, for example, be present in the range of about 0.5 to about 50 weight percent, or preferably within the range of about 1 to about 25 weight percent, or more preferably within the range of about 2 to about 15 weight percent. Although the use of Class F fly ash as the low-calcium pozzolanic material is primarily described herein, other types of relatively low calcium and/or high silicon pozzolanic materials may be used in some embodiments as partial or total substitutes for the Class F fly ash (for example, Class N pozzolanic ash, volcanic ash, bottom ash, wood ash, municipal incinerator ash, zeolites etc.) To the extent that low calcium content pozzolanic powders comprise a large proportion of the pozzolanic powder component, calcium-rich materials must be added to the composition to provide the required calcium content. Preferred calcium-rich materials include industrial byproducts such as blast furnace slag, cement kiln dust, lime kiln dust and scrubber ash.

Silica fume may be used in the cement to increase short term strength, long term strength, bond strength, elastic properties and/or thermal properties. When present, silica fume may be present, for example, in the range of about 0.5 to about 10 weight percent, or preferably within the range of about 1 to about 7 weight percent.

Preferably, the cement comprises a total calcium content expressed as the oxides of 20 weight percent or more. If the CaO content is low, additional lime bearing components such as calcium hydroxide, nitrate, nitrite, sulfate or carbonate may be added to achieve this calcium content.

Calcium aluminate may be used to increase the short-term strength development of the product. Calcium aluminate may, for example, be present in the range of about 1 to about 25 weight percent, or within the range of about 5 to about 20 weight percent.

Magnesium oxide may be used to enhance volume stability of the product. Magnesium oxide may, for example, be present in the range of about 0.5 to about 15 weight percent, or within the range of about 2 to about 10 weight percent.

Lime (CaO or CaOH) additions can be used to enhance product workability, act as a shrinkage compensator, and/or function as an accelerator. Lime may, for example, be present in the range of about 0.1 to about 5 weight percent. The amount of lime added to the composition may be dependent upon the amount of lime present in the fly ash.

One or more activators from the hydroxycarboxylic acid, dicarboxylic acid, and carboxylic acid families may be included. For example, salts of glycolic acid, glyceric acid, malic acid, tartaric acid, malonic acid, glutaric acid, maleic acid, formic acid, acetic acid, propionic acid, and butyric acid may, for example, be present in the range of about 0.1 to about 30 weight percent, compared to the total weight of the pozzolanic cement composition, or preferably from about 2 to about 5 weight percent, compared to the total weight of the pozzolanic cement composition. These activators may be the only activators present in the cement. Alternatively, other activators may be present, provided that the hydroxycarboxylic acid, dicarboxylic acid, and carboxylic acid activators listed above make up 50% or more of the activator component.

Other examples of pH neutral activators that may be used include citric salts, lactic salts, and other carboxylic acids and salts of those acids including but not limited to nitrates, nitrites, chlorides, thiocyanates.

One or more accelerators from the amine family may be used in place of or in addition to the activators described, especially if almost instant set time is desired. Such accelerators may be triethanolamine and triisopropanolamine, in addition to others. The accelerators may be present, for example, in an amount of about 0.1 to about 30 percent by weight of the pozzolanic cement composition.

Hepto-gluconate, sulfate salts, sugars, sugar acids, and lignins may be used as retarders. Theses retarders may be used alone or in combination with the borate retarders or other known retarders. For example, a retarder may combine a small amount of hepto-gluconate with a mixture of sodium lactate and 22% boric acid. When this retarder is used with high-ash pozzolan, a longer set time can be achieved. These retarders are generally present in the range of about 0.1 to about 10 weight percent of the pozzolanic cement composition. Hepto-gluconates such as sodium, calcium, magnesium, and zinc hepto-gluconate may be used. Lignins suitable as retarders include the sodium and calcium salts of lignosulfonic acids. Sugars may be, for example, sucrose, glucose, fructose, maltose, trehalose, and raffinose. Sugar acids may be, for example, aldohexonic acid, ascorbic acid, glyceric acid, and gluconic acid. Sulphate salts such as gypsum may be used.

Borates may be used as strength gain retarders in addition to or instead of the above-mentioned retarders. Preferred borates include one or more retarding additives from the borate salt family, for example, borax may be present in the range of about 0.1 to about 10 weight percent, or preferably 0.1 to 3 weight percent, or more preferably from 0.1 to about 2 weight percent. Boric acid may also or alternatively be used as the borate may, for example, be present in the range of about 0.1 to about 10 weight percent, or preferably within the range of about 0.1 to 5 weight percent or more preferably within the range of about 0.2 to about 1.7 weight percent. Other borates such as potassium borate, sodium borate, potassium tetraborate and sodium tetraborate hydrates may additionally or alternatively be used. These borates may be added to increase bond strength to the existing substrate and as a retarder.

Miscellaneous ingredients including, for example, reactive clays such as meta-kaolin, wollastonite, air entraining agents (AEA), latex, fibers (for fracture toughness), shrinkage compensators (SRA), viscosity modifying agent (VMA) and plasticizers.

In some embodiments, the cements of the present invention are substantially free of Portland cement, slag cements, and other types of conventional cements. In other embodiments, the cements of the invention may include other cements, including Portland cement, provided that such other cements comprise less than about 20 weight percent, preferably less than about 15 weight percent, and more preferably less than 10 weight percent, of the total weight of the cement.

Embodiments may also or alternatively be substantially free of alkali metal activators such as alkali hydroxides (≈pH 12-14) and metal carbonates (≈pH 11.6) as used in other types of materials. Embodiments may also or alternatively be substantially free of citric acids (≈pH 2.2) and or other acids.

Cement compositions according to the invention may include one or more fillers in addition to the cement. According to some embodiments, the fine aggregate (sand) particle sizes can range from fine silica sand to naturally or manufactured sand to conform to ASTM specifications. These fillers may include, for example, silica sand, natural sand, manufactured fine aggregate from stone production, bottom ash, slag, ground glass, recycled concrete and/or recycled foundry sands. Specific examples of fillers include different aggregate gradations, such as C33 sand, NJ 60 sand, C144 sand, #8 stone, and #57 stone or others.

In certain embodiments, various retarder ingredients may combine with boric acid to produce synergetic effects such as prolonging the set time of cement compositions as well as increasing the compressive strength of the cement compositions. For example, a retarder may combine boric acid with any one or more of the following ingredients: glycolic acid, glyceric acid, malic acid, tartaric acid, sodium glycolate, sodium glycerate, sodium malate, sodium tartrate, malonic acid, glutaric acid, maleic acid, disodium malonate, sodium glutarate, formic acid, acetic acid, propionic acid, butyric acid, sodium formate, sodium acetate, sodium propionate, sodium butyrate, sodium sulfate, glucose, triethanolamine, and trisopropanolamine.

In terms of prolonging the set time, the tartaric acid, sodium tartrate, and sodium butyrate combinations are most effective, and preferably, the tartaric acid combination can be more effective than either combination, and the sodium butyrate combination can be least effective among the three. Also, the set time is prolonged more with a higher dosage of the ingredient: for example, tartaric acid added to the cement mixture at 2.0% of fly ash prolongs the set time of the mixture more than adding the same ingredient at 1.0% or 0.5% of the fly ash, and adding at 1% prolongs the set time more than adding it at 0.5%.

In terms of increasing the compressive strength, the tartaric acid, sodium tartrate, and sodium sulfate combinations are most effective, and preferably the tartaric acid and sodium tartrate combinations can be more effective than the sodium sulfate combination, with the sodium tartrate combination producing a little higher strength than the tartaric acid. In this case, the compressive strength is increased with a lower dosage of the ingredient used: for example, 0.5% of sodium tartrate increases the compressive strength of the resulting composition more than using 1 or 2% of the same ingredient.

Preferably, tartaric acid may be used as a supplement retarder to boric acid, using tartaric acid's high solubility of 133 g/mL as opposed to the poor solubility of boric acid at 5 g/mL. This high solubility of tartaric acid could allow, for example, producing of a 50% solution of tartaric acid, which will be provide 1 to 2 hours in set time increase per 1 oz/cwt. In other words, 5 oz/cwt of tartaric acid solution can provide 5 to 10 hours of additional set time.

Alternatively or additionally, various activator ingredients (or alternate activators) may be used to replace sodium lactate and to work along with boric acid in the cement compositions to produce similar synergetic effects of prolonging the set time and increasing the compressive strengths. For example, any one or more of the following ingredients may be used as a replacement of sodium lactate and to work along with boric acid in the cement compositions: sodium glycolate, sodium glycerate, sodium malate, sodium tartrate, sodium glutarate, disodium malonate, sodium sulfate, sodium formate, sodium acetate, sodium propionate, and sodium butyrate.

All of these alternate activators may be used to achieve higher compressive strength, except for sodium butyrate. Some activators may be susceptible to boric acid, namely, sodium tartrate, sodium sulfate, sodium propionate and sodium acetate, and consequently, may significantly prolong the set time. But these mixtures will eventually harden. Conversely, the sodium malate, sodium glycolate and sodium formate mixtures may produce set times similar to those of sodium lactate while also hardening the cement compositions. In sum, although all of the above-identified alternate activator mixtures may be able to harden and gain strength for the cement compositions, the compressive strength actually produced can also be dependent on the set times of the resulting mixture.

This invention will be better understood with reference to the following examples, which are intended to illustrate specific embodiments within the overall scope of the invention.

EXAMPLES

A first example is a cement mixture that includes an activator. The mixture includes fly ash in 2417.6 grams, fine aggregates in 4835.1 grams, activator(s) in 58.1 grams, boric acid in 16.4 grams, and water in 599.28 grams. This composition includes 0.68% of boric, and the water to boric ratio becomes 0.248. An activator can be chosen from any one or more of the activator candidates discussed above, and depending on types of activators, the resulting cement composition may have different set time and compressive strengths.

Table 1 below shows a result of an experiment showing different performance of cement compositions depending on different activators. In the experiment, Class C fly ash was used, which includes, for example, crystalline silica (2-7%), silicon dioxide (28%), aluminum oxide (18%), calcium oxide (29%), iron oxide (5%), magnesium oxide (7%), sodium oxide (3%), sulfur trioxide (4%), titanium dioxide (1%), and phosphorus pentoxide (1%) with 2% loss on ignition.

The different activators tested are sodium lactate control (Mix 1), sodium tartrate (Mix 2), sodium malate (Mix 3), sodium glycolate (Mix 4), sodium sulfate (Mix 5), sodium propionate (Mix 6), and sodium acetate (Mix 6). While these activators were tested individually to distinguish effect of one from another, these activators can also be used in any one or more combinations. Further, other activator candidates that are mentioned above but not tested in this particular experiment can be used separately or in combination with any one or more of the tested activators.

TABLE 1

| Different Activator Performance | | | | | | | |
|---|---|---|---|---|---|---|---|
| Mix Number | Mix 1 | Mix 2 | Mix 3 | Mix 4 | Mix 5 | Mix 6 | Mix 6 |
| Activator | Sodium Lactate | Sodium Tartrate | Sodium Malate | Sodium Glycolate | Sodium Sulfate | Sodium Propionate | Sodium Acetate |

TABLE 1-continued

Different Activator Performance

| Mix Number | Mix 1 | Mix 2 | Mix 3 | Mix 4 | Mix 5 | Mix 6 | Mix 6 |
|---|---|---|---|---|---|---|---|
| Fly ash (gr) | 2417.6 | 2417.6 | 2417.6 | 2417.6 | 2417.6 | 2417.6 | 2417.6 |
| Fine Ag. (gr) | 4835.1 | 4835.1 | 4835.1 | 4835.1 | 4835.1 | 4835.1 | 4835.1 |
| Activator (gr) | 58.1 | 58.1 | 58.1 | 58.1 | 58.1 | 58.1 | 58.1 |
| Boric Acid (gr) | 16.4 | 16.4 | 16.4 | 16.4 | 16.4 | 16.4 | 16.4 |
| Water (gr) | 599.28 | 599.28 | 599.28 | 599.28 | 599.28 | 599.28 | 599.28 |
| Boric (%) | 0.68% | 0.68% | 0.68% | 0.68% | 0.68% | 0.68% | 0.68% |
| w/b design | 0.248 | 0.248 | 0.248 | 0.248 | 0.248 | 0.248 | 0.248 |
| % Flow | — | — | 107 | 108 | 96 | — | 96 |
| Setting T. (H:M) | 0.6 | 48 | 2.97 | 1.13 | 11.65 | 30.92 | 13.08 |
| 1 day compressive strength (psi) | 4629 | 0 | 5562 | 3829 | 2909 | 0 | 2284 |
| 7 day compressive strength (psi) | 6480 | 923 | 7460 | 6839 | 4625 | 3103 | 4369 |

Mix 1 resulted in the set time of approximately 6 minutes, the first day compressive strength of about 4629 psi, and the $7^{th}$ day compressive strength of about 6480 psi. As shown in the table above, different mixtures resulted in different set time and compressive strengths.

A second example is a cement mixture that includes a retarder. The ratio of ingredients in the mixture composition may be the same as in the first example, only with a retarder added to the mixture at 0.5%, 1.0% or 2.0% of fly ash. Depending on different types of retarders and amounts added to the mixture, the resulting cement composition shows different set time and compressive strengths.

Table 2 below shows a result of an experiment showing different performance of cement compositions depending on different retarders added in different amounts. Tested retarders include glycolic acid, tartaric acid, sodium glycolate, sodium malate, sodium tartrate, disodium malonate, acetic acid, sodium formate, sodium acetate, sodium propionate, sodium butyrate, sodium sulfate, and glucose. While these retarders were tested individually to distinguish effect of one from another, these retarders can also be used in any one or more combinations. Further, other retarder candidates that are mentioned above but not tested in this particular experiment can be used separately or in combination with any one or more of the tested activators.

A mixture may combine any one or more of the activators and retarders discussed above. In certain embodiments, amine-based ingredients such as amine-based accelerators may not be useful in the context of activations or retardation, especially if almost instant set is not desired.

Manufacturing Methods

The large area products may be produced by mixing all the ingredients except for the activator prior to use. The activator may then be added at the time when you need the concrete to initiate its reaction. Once the activator is added, the chemical reaction leading to final set has been started. The specific blend will determine how much working time is available prior to the final set.

For example, a transit truck may load a mix at a batch plant. The transit truck now has 4-6 hours or more before the concrete will no longer be useable. At any point in that time period, the activator, as a liquid or as a solid power, may be added (most likely at the construction site), and the concrete may be placed. This ability provides a huge advantage over Portland cement concrete, which typically has 90 minutes of acceptable working time from the moment the transit truck is loaded at the batch plant.

The volumetric mixable products may be made by adding uniform portions of cement, stone, and sand under remote control operation. The cement portion containing both the accelerator and the retarder may be blended with sand and

TABLE 2

Different Retarder Performance

| | Set Time (hr) | | | 7-Day Compressive Strength (psi) | | |
|---|---|---|---|---|---|---|
| Retarder | 0.5% addition | 1% addition | 2% addition | 0.5% addition | 1% addition | 2% addition |
| No retarder | | 8.53 | | | 8325 | |
| Glycolic Acid | 5 | 4.22 | 1.5 | 8358 | 7188 | 6748 |
| Tartaric Acid | 26.78 | 43.7 | 72 | 9619 | 5103 | 85 |
| Sodium Glycolate | 7.2 | 5.32 | 4.6 | 8404 | 7260 | 6503 |
| Sodium Malate | 9 | 9.5 | 5.73 | 8715 | 8119 | 7398 |
| Sodium Tartrate | 22.6 | 52.63 | 59.58 | 10057 | 8888 | 7556 |
| Disodium Malonate | 7.8 | 5.35 | 3.68 | 8196 | 7258 | 6675 |
| Acetic Acid | 5.25 | 4.12 | 2.15 | 8627 | 5793 | 7352 |
| Sodium Formate | 5.66 | 2.5 | 1.9 | 7548 | 6464 | 5015 |
| Sodium Acetate | 7.33 | 6.17 | 4.65 | 7649 | 7108 | 6557 |
| Sodium Propionate | 7.02 | 7.12 | 1.53 | 7398 | 6799 | 6050 |
| Sodium Butyrate | 8.83 | 10.05 | 11.73 | 7417 | 6799 | 5722 |
| Sodium Sulfate | 7.6 | 5.98 | 5.7 | 8682 | 8159 | 8080 |
| Glucose | 7.88 | 4.37 | 3.4 | 8195 | 6290 | 2534 | stone in the high shear mixer. As an option to this approach, the accelerant and retarder may be added in either powder or liquid form.

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

What is claimed is:

1. A pozzolanic cement composition comprising:
   a pozzolanic material, and
   an activator comprising a salt of glycolic acid, glyceric acid, malic acid, tartaric acid, malonic acid, glutaric acid, maleic acid, formic acid, acetic acid, propionic acid, or butyric acid present in an amount of 0.1 to 30% of the total weight of the pozzolanic cement composition, wherein the pozzolanic cement composition has less than 10% by weight Portland cement.

2. The pozzolanic cement composition of claim 1, wherein the total amount of the salt of glycolic acid, glyceric acid, malic acid, tartaric acid, malonic acid, glutaric acid, maleic acid, formic acid, acetic acid, propionic acid, and butyric acid comprises more than 95% by weight of the total weight of activators in the pozzolanic cement composition.

3. The pozzolanic cement composition of claim 1 further comprising a retarder selected from the group consisting of sulfate salts, sugars, sugar acids, lignins, boron compounds or combinations thereof.

4. The pozzolanic cement composition of claim 1, wherein the pozzolanic cement composition is substantially free of Portland cement.

5. The pozzolanic cement composition of claim 1, wherein the pozzolanic cement composition has a set time of between 0.5 hours and 24 hours.

6. The pozzolanic cement composition of claim 1, wherein the pozzolanic material is selected from the group consisting of Class C fly-ash, Class F fly-ash, Class N pozzolanic ash, and combinations thereof.

7. The pozzolanic cement composition of claim 1, wherein the pozzolanic cement composition has a silica to calcia molar ratio of between about 1.2:1 and 1.4:1.

8. The pozzolanic cement composition of claim 1, wherein the pozzolanic cement composition is substantially free of citric acid activators, lactic acid activators, alkali metal activators, and metal carbonate activators.

9. The pozzolanic cement composition of claim 3, wherein the retarder comprises 0.1 to 3.0% of the total weight of the pozzolanic cement composition.

10. A pozzolanic cement composition comprising:
    a pozzolanic material, and
    a retarder selected from the group consisting of sulfate salts, sugars, sugar acids, lignins, boron compounds or combinations thereof present in an amount of 0.1 to 30% of the total weight of the pozzolanic cement composition, wherein the pozzolanic cement composition has less than 10% by weight Portland cement.

11. The pozzolanic cement composition of claim 10 further comprising an accelerator comprising an amine.

12. The pozzolanic cement composition of claim 10, wherein the accelerator comprises triethanolamine or triisopropanolamine.

13. The pozzolanic cement composition of claim 10, wherein the pozzolanic cement composition is substantially free of Portland cement.

14. The pozzolanic cement composition of claim 10, wherein the pozzolanic cement composition has a set time of between 0.5 hours and 24 hours.

15. The pozzolanic cement composition of claim 10, wherein the pozzolanic material is selected from the group consisting of Class C fly-ash, Class F fly-ash, Class N pozzolanic ash, and combinations thereof.

16. The pozzolanic cement composition of claim 10, wherein the pozzolanic cement composition has a silica to calcia molar ratio of between about 1.2:1 and 1.4:1.

17. The pozzolanic cement composition of claim 10, wherein the pozzolanic cement composition is substantially free of citric acid activators, lactic acid activators, alkali metal activators, and metal carbonate activators.

18. The pozzolanic cement composition of claim 11, wherein the retarder comprises 0.1 to 3.0% of the total weight of the pozzolanic cement composition.

19. A pozzolanic cement composition comprising:
    a pozzolanic material,
    an activator or accelerator, and
    a retarder comprising hepto-gluconate wherein the pozzolanic cement composition has less than 10% by weight Portland cement.

20. The pozzolanic cement composition of claim 19, comprising an activator and an accelerator.

21. The pozzolanic cement composition of claim 19, wherein the retarder further comprises a boron compound.

22. The pozzolanic cement composition of claim 21, wherein the boron compound is selected from the group consisting of boric acid, boric oxide, sodium borate, sodium tetraborate, potassium borate and potassium tetraborate, borax pentahydrate, and borax decahydrate.

23. The pozzolanic cement composition of claim 19, wherein the retarder comprises 0.1 to 3.0% of the total weight of the pozzolanic cement composition.

24. The pozzolanic cement composition of claim 19, wherein the pozzolanic cement composition is substantially free of Portland cement.

25. The pozzolanic cement composition of claim 19, wherein the pozzolanic cement composition has a set time of between 0.5 hours and 24 hours.

26. The pozzolanic cement composition of claim 19, wherein the pozzolan material is selected from the group consisting of Class C fly-ash, Class F fly-ash, Class N pozzolanic ash, and combinations thereof.

27. The pozzolanic cement composition of claim 19, wherein the pozzolanic cement composition has a silica to calcia molar ratio of between about 1.2:1 and 1.4:1.

28. The pozzolanic cement composition of claim 19, wherein the pozzolanic cement composition is substantially free of citric acid activators, lactic acid activators, alkali metal activators, and metal carbonate activators.

29. A method of forming a hardened pozzolanic cement composition comprising:
    mixing a hydratable composition comprising pozzolanic material,
    one or more activators or accelerators; and
    a retarder comprising hepto-gluconate wherein the pozzolanic cement composition has less than 10% by weight Portland cement.

30. The method of claim 29, wherein the retarder further comprises a boron compound.

31. The method of claim 30, wherein the boron compound is selected from the group consisting of boric acid, boric oxide, sodium borate, sodium tetraborate, potassium borate and potassium tetraborate, borax pentahydrate, and borax decahydrate.

32. The method of claim 30, wherein the retarder comprises 0.1 to 3.0% of the total weight of the hardened pozzolanic cement composition.

33. The method of claim 29, wherein the hydratable composition has a set time of between 2 hours and 24 hours after mixing with the activators and hepto-gluconate.

34. The method of claim 29, wherein the hydratable composition comprising pozzolanic material comprises pozzolans selected from the group consisting of Class C fly-ash, Class F fly-ash, Class N pozzolanic ash, and combinations thereof.

35. The method of claim 29, further comprising dissolving the hepto-gluconate in a solution of activator and accelerator in a concentration between 0.1% and 30.0% prior to mixing with the pozzolanic material.

36. The method of claim 29, further comprising dissolving the hepto-gluconate in a solution of activator and accelerator in a concentration between 10.0% and 30.0% prior to mixing with the pozzolanic material.

* * * * *